No. 748,175. PATENTED DEC. 29, 1903.
R. DUNNE.
MITER BOX.
APPLICATION FILED APR. 30, 1903.
NO MODEL.
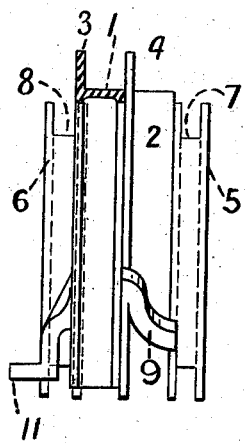
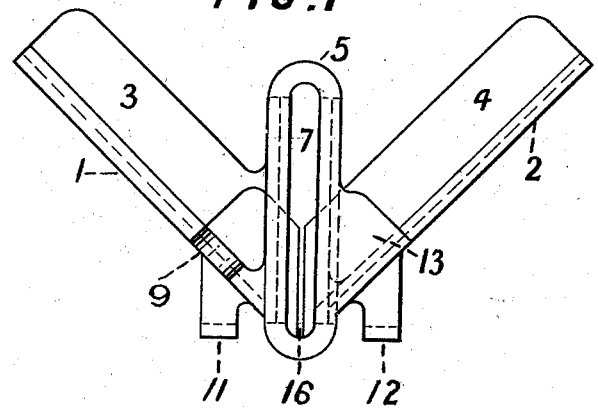
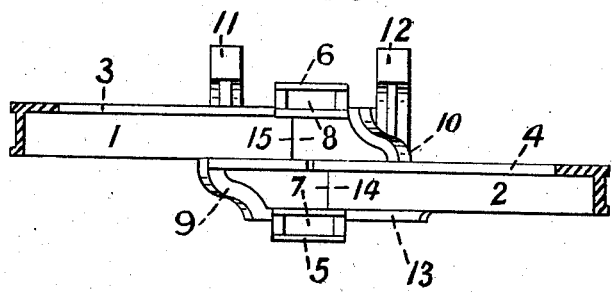
WITNESSES
H. M. Kuchne
John A. Percival
INVENTOR
Ralph Dunne
By Richardson
ATTORNEYS.

No. 748,175. Patented December 29, 1903.

UNITED STATES PATENT OFFICE.

RALPH DUNNE, OF DUNEDIN, NEW ZEALAND.

MITER-BOX.

SPECIFICATION forming part of Letters Patent No. 748,175, dated December 29, 1903.

Application filed April 30, 1903. Serial No. 155,042. (No model.)

*To all whom it may concern:*

Be it known that I, RALPH DUNNE, picture-framer, of George street, Dunedin, New Zealand, have invented a certain new and useful Improved Miter-Box, of which the following is a specification.

This invention relates to devices in which molding and the like is placed for the purpose of being cut by a saw at an angle so as to form a miter-joint when the cut pieces are joined together.

The leading feature of this invention is that one piece of molding without any previous sawing or cutting to form a desired angle roughly is held in a plane to be cut by a saw at an angle simultaneously with a second similar piece of molding held at a desired angle with the first piece of molding in a plane parallel with the first-mentioned plane, with the intent that the two pieces of molding may be subsequently joined together at the cut faces immediately on being removed from the device to form a miter-joint without any intermediate shaving or fitting. The devices heretofore in use require the insertion and cutting of one piece of molding at an angle, then subsequently the insertion and cutting of another piece of molding at the same angle, with the result that these two pieces can seldom, if ever, be joined to form a good miter-joint without some fitting of them by shaving or shooting the cut faces. Thus by my invention in making a picture-frame, for instance, four cuts of the saw are all that are required where no slips are used—namely, one for each corner—instead of eight cuts, as is necessary by the devices now in use.

The device may be made in various forms, but they all consist essentially of two boxes or arms placed at a desired angle with each other in different but parallel planes. Each arm consists of a rest provided with a flange perpendicular thereto, and the flanges are in different but parallel planes and these planes are preferably vertical. A piece of molding is secured to one rest against its flange and another piece of molding is placed on or secured to the other rest against its flange, and the lower ends of these pieces of molding cross each other and project past the intersection of the arms. Saw-guides are formed in a plane passing through this intersection and bisecting the angle between the arms, and the edges of the moldings are so arranged that the saw will commence cutting them simultaneously and pass through them simultaneously bisecting the angle between the arms.

One form of the invention is illustrated in the drawings, in which the arms are fixed at right angles to each other and in which a handsaw is used.

Figure 1 is a side view of the invention in its simplest form. Fig. 2 is an end view of Fig. 1. Fig. 3 is a plan view of Fig. 1.

The rests 1 and 2 are fixed rigidly at right angles to each other, having flanges 3 and 4 in different but parallel planes, respectively, and on the rests against the flanges the moldings to be cut are placed. A vertical piece 5 is secured by means of the bracket 9 to the rest 1 and by means of the piece 13 to the rest 2. Another vertical piece 6 is made integral with the flange 3 and is also secured by means of the bracket 10 to the flange 4. These vertical pieces are provided with slots 7 and 8, in which pieces of wood, or of any other suitable material, are fitted to form guides for the saw. The brackets 9 and 10, in conjunction with these vertical pieces, secure the rests 1 and 2 together. Brackets 11 and 12, attached, preferably, to the flanges, are provided to attach the device to a table and clamp it thereto. Open spaces 14 and 15 are left at the bottom of the rests and flanges, so that the ends of the moldings placed on the latter may pass through said openings crossing one another. The flange 4 is prolonged past the intersection and up the rest 1 for strength and is slotted at 16 to provide a passage for the saw.

In this form of the invention one piece of molding is placed on the rest 1 against the flange 3 and clamped, and a second piece is also placed on the rest 2 against the flange 4 and clamped, so that the lower ends of these two pieces cross each other and are in such a position that the saw cuts them both simultaneously. When these two pieces are removed from the device, the cut edges may be joined together without any shaving or shooting, and they will then form in this case a right angle.

Graduated bars may also be placed on the arms with movable stops slidable thereon, forming also pieces against which the ends of the moldings may be placed in order that they may be cut to a desired length. The arms may have a connection between them in the nature of a hinge with means for adjusting same, and one of the flanges may be provided with means for giving it a movement parallel to itself, so as to admit of thicker moldings.

Having now described my invention, what I claim as new, and desire to secure by Letters Patent, is—

1. In a miter-box a flanged rest for one molding a second flanged rest at an angle with said first rest for another molding said flanges being in parallel planes and cutting means substantially as described.

2. An improved miter-box consisting of two arms secured at an angle with each other in different planes flanges perpendicular to said arms in different but parallel planes and saw-guides in a plane bisecting said angle substantially as and for the purposes set forth.

3. A miter-box consisting of two arms secured at an angle with each other a flange to each of said arms said flanges being in parallel planes a slotted piece secured to said flanges and another opposite slotted piece secured to an arm and a prolongation of the flange of same arm substantially as described.

In witness whereof I have hereunto set my hand in presence of two witnesses.

RALPH DUNNE.

Witnesses:
A. J. PARK,
J. R. PARK.